United States Patent
Kominami et al.

[11] Patent Number: 6,121,339
[45] Date of Patent: Sep. 19, 2000

[54] CATIONICALLY POLYMERIZABLE EPOXY RESINS AND OPTICAL INFORMATION RECORDING MEDIUM MADE THEREFROM

[75] Inventors: Hiraku Kominami; Kozaburo Hayashi; Kazuki Shibata, all of Tochigi, Japan

[73] Assignee: Sony Chemicals Corporation, Tokyo, Japan

[21] Appl. No.: 08/952,228

[22] PCT Filed: Mar. 17, 1997

[86] PCT No.: PCT/JP97/00848

§ 371 Date: Feb. 12, 1998

§ 102(e) Date: Feb. 12, 1998

[87] PCT Pub. No.: WO97/33932

PCT Pub. Date: Sep. 18, 1997

[30] Foreign Application Priority Data

Mar. 15, 1996 [JP] Japan .................... 8-059555

[51] Int. Cl.⁷ .............. C08F 2/48; C08L 63/02; C08J 3/28; G11B 7/24

[52] U.S. Cl. .......... 522/31; 369/275.1; 428/414; 522/32; 522/66; 523/427; 525/524

[58] Field of Search .............. 525/524; 522/31, 522/32, 66; 369/275.1; 428/414; 523/427

[56] References Cited

U.S. PATENT DOCUMENTS

| | | | |
|---|---|---|---|
| 4,565,859 | 1/1986 | Murai et al. | 525/481 |
| 4,835,193 | 5/1989 | Hayase et al. | 522/170 |

FOREIGN PATENT DOCUMENTS

| | | |
|---|---|---|
| 58-176237 | 10/1983 | Japan . |
| 61-163923 | 7/1986 | Japan . |
| 1-49144 | 2/1989 | Japan . |
| 1-204982 | 8/1989 | Japan . |
| 2-113022 | 4/1990 | Japan . |
| 4-11625 | 1/1992 | Japan . |
| 5-32866 | 2/1993 | Japan . |
| 5-43866 | 2/1993 | Japan . |
| 5-117592 | 5/1993 | Japan . |
| 6-57103 | 1/1994 | Japan . |
| 6-57103 | 3/1994 | Japan . |

OTHER PUBLICATIONS

Chemical abstracts registry No. 1304–76–3 for bismuth oxide, 1966.
Chemical abstracts registry No. 10361–44–1 for bismuth nitrate, 1966.

*Primary Examiner*—Robert E. Sellers
*Attorney, Agent, or Firm*—Frommer Lawrence & Haug, LLP; William S. Frommer

[57] ABSTRACT

An epoxy resin composition according to the present invention is one initiating cationic polymerization upon irradiation with energy rays. The epoxy resin composition is formed of at least bisphenol epoxy resin (A) as an active ingredient, epoxy resin (B) shown in the following formula and cationic polymerization catalyst (C).

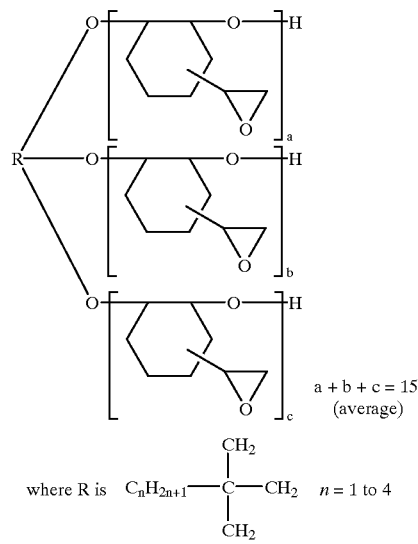

5 Claims, 1 Drawing Sheet

CATIONICALLY POLYMERIZABLE EPOXY RESINS AND OPTICAL INFORMATION RECORDING MEDIUM MADE THEREFROM

TECHNICAL FIELD

The present invention relates to an epoxy resin composition initiating cationic polymerization upon irradiation with energy rays as well as an optical information recording medium such as an optical disk etc. using the resin composition as an adhesive layer.

BACKGROUND ART

Recently, attention is drawn to optical disks, particularly a digital video disk (DVD) that records a moving image and a sound in a digital system.

Generally, the optical disk e.g. a DVD requiring a large capacity has a structure so-called as a lamination type optical disk which includes, as shown in a schematic view of an optical disk 30 in FIG. 2, two disk substrates 24 having two transparent plastic substrates 21, each being formed on its one side with a recording and reflective layer 22 having formed with a concave and a convex (pits) corresponding to recording information and a protective layer 23 successively in this order, the disk substrates facing each other such that their recording layers (reflective layers) 22 are arranged inside and integrated via an adhesive layer 25.

Adhesives such as a hot-melt type adhesive or a radical polymerizable ultraviolet-curing adhesive have been used as the adhesive layer 25 for bonding the disk substrates 24, but they do not suffice for practical purposes in respect of thermal resistance and disk base warpage.

Under the circumstances, a method of manufacturing an optical disk is proposed as described in e.g. Japanese laid-open Publication No. 7-126577 in which a liquid cationic polymerizable, ultraviolet ray-curing adhesive layer is formed on a bonding face between 2 disks, irradiated with energy rays to effect the bonding and then two disks are bonded with pressure, followed by solidification of the layer.

Such a cationic polymerizable, ultraviolet-curing adhesive layer will initiate curing reaction whether in the air or in a dark place upon exposure to ultraviolet rays once and hence it is expected to have an significant effect on the improvement of the manufacturing process. The cationic polymerizable, ultraviolet-curing adhesive has the advantage of less warpage of disk substrates by virtue of less shrinkage at the time of the reaction, and the adhesive layer after curing becomes extremely hard.

However, even in cases where such cationic polymerizable, ultraviolet-curing adhesives are used, the resulting products cannot suffice under the circumstances of high temperature and high humidity.

For example, if the above-mentioned optical disk is stored under the circumstances of high temperature and high humidity, a tilt angle (i.e. angle from a horizontal plane) of the optical disk is enlarged due to distortion or warpage of the disk, causing an adverse effect on the reproduction of a recorded signal so that the recorded information cannot correctly be read out.

This is particularly a great problem for a DVD requiring high reading accuracy because a concave and a convex (pits) on the recording layer have been further minimized for large capacity.

Further, the laminated disk for a DVD is soft and thus tends to easily undergo warpage or bending because it is thinner than a conventional laminated disk such as a laser disk etc.

Furthermore, in the recording layer there occurs a trace of corrosion under the circumstances of high temperature and high humidity.

As a result of detailed examinations by the present inventors et al., it was estimated that the warpage or bending under the circumstances of high temperature and high humidity resulted from the inadequate thermal resistance and adhesiveness of the adhesive layer.

That is, under the circumstances of high temperature and high humidity, the adhesive layer generally requires thermal resistance. However, if thermal resistance is improved, the hardness of the adhesive layer is increased while its adhesiveness is lowered in many cases. In addition, if the moisture absorption property of the adhesive layer is high, the adhesive layer is easily swollen to lower adhesiveness. These reasons presumably cause the above distortion or warpage.

For the corrosion of the recording layer, it is estimated that because cationic polymerization makes use of an organic salt as a catalyst, such an ionic substance remaining in the adhesive layer causes the corrosion of a metal in an Al layer etc. forming the recording layer at high temperature and high humidity.

The present invention was made in view of the above-described problem, and a first object of the present invention is to provide a resin composition excellent in thermal resistance.

Further, a second object of the present invention is to provide an epoxy resin composition with adhesive properties which are not lowered even if the adhesive layer has increased thermal resistance and hardness or is placed under high humidity.

Moreover, a third object of the present invention is to provide an epoxy resin composition for preventing an adhered body from being subject to the adverse effect by an ionic substance in the adhesive layer even under high humidity circumstance.

Finally, a fourth object of the present invention is to provide an optical information recording medium e.g. optical disk excellent in reproduction of recorded signals, which is prepared by bonding disk substrates through an adhesive layer consisting of the resin composition as the first to third objects.

DISCLOSURE OF THE INVENTION

The present invention is a ultraviolet-curing resin composition, which is an epoxy resin composition initiating cationic polymerization upon exposure to energy rays, comprising at least bisphenol type epoxy resin (A) as an active ingredient, epoxy resin (B) shown in the following formula and cationic polymerization catalyst (C). In the following formula, R is $C_nH_{2n+1}C(CH_2)_3$, and a+b+c is 15 in average.

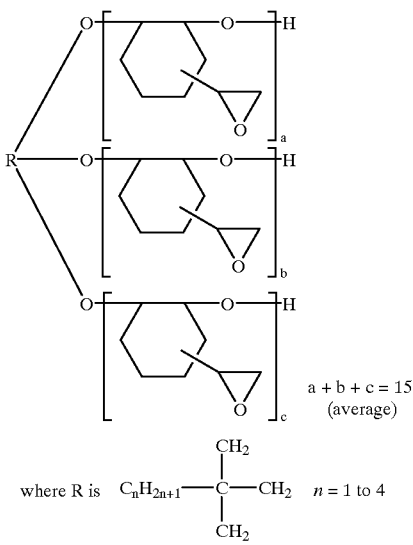

where R is $C_nH_{2n+1}\!-\!\underset{\underset{CH_2}{|}}{\overset{\overset{CH_2}{|}}{C}}\!-\!CH_2$   $n = 1$ to $4$ $a + b + c = 15$ (average)

The epoxy resin composition according to the present invention is one in which the ratio by weight between the bisphenol type epoxy resin (A) in the above epoxy resin composition and the epoxy resin (B) ranges from 100/5 to 100/50.

The epoxy resin composition according to the present invention is one in which ion exchanger (D) is further incorporated in the above epoxy resin composition.

An optical information recording medium according to the present invention having a recording layer and an adhesive layer between at least 2 substrates is characterized in that the adhesive layer is formed of an adhesive made of the above-mentioned epoxy resin composition.

In the present invention, the thermal resistance of the epoxy resin composition undergoing cationic polymerization can be improved by further incorporating the epoxy resin of the above formula into the bisphenol type epoxy resin as the active ingredient.

Further, both the thermal resistance and adhesive properties of the adhesive layer or the adhesive properties of the adhesive layer under high humidity can be made compatible by mixing the bisphenol type epoxy resin and the epoxy resin of the above formula at a specific weight ratio.

Further, the recording layer can be prevented from corroding by further incorporating an ion exchanger into the above epoxy resin composition according to the present invention because the ion exchanger captures the ionic substance in the adhesive layer.

Further, no distortion or warpage occurs even under the circumstances of high temperature and high humidity by using the adhesive composition as an adhesive layer on the bonding face of disk substrates according to the present invention, and therefore, an optical information recording medium excellent in reproducing a recorded signal can be obtained.

BEST MODE FOR CARRYING OUT THE INVENTION

Figure 1:
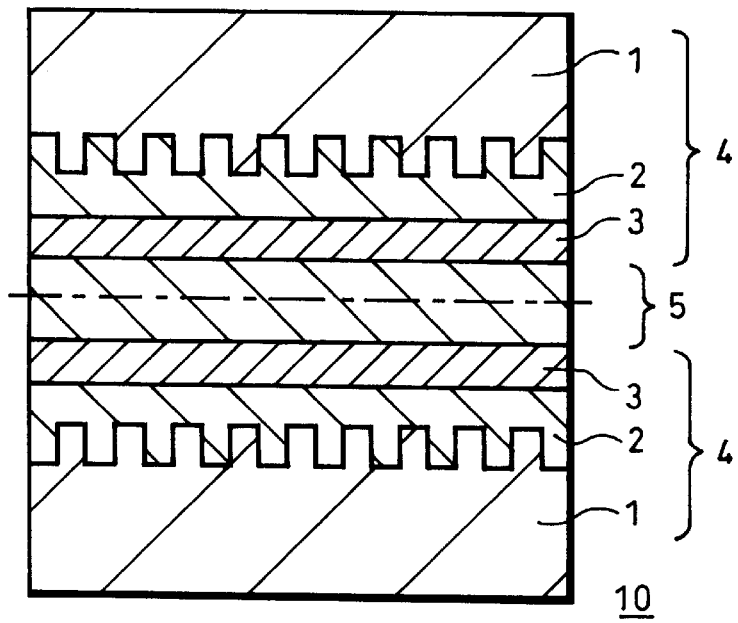
FIG. 1 is a schematic sectional view of an optical information recording medium to which an epoxy resin composition of the present invention is to be applied.
Figure 2:
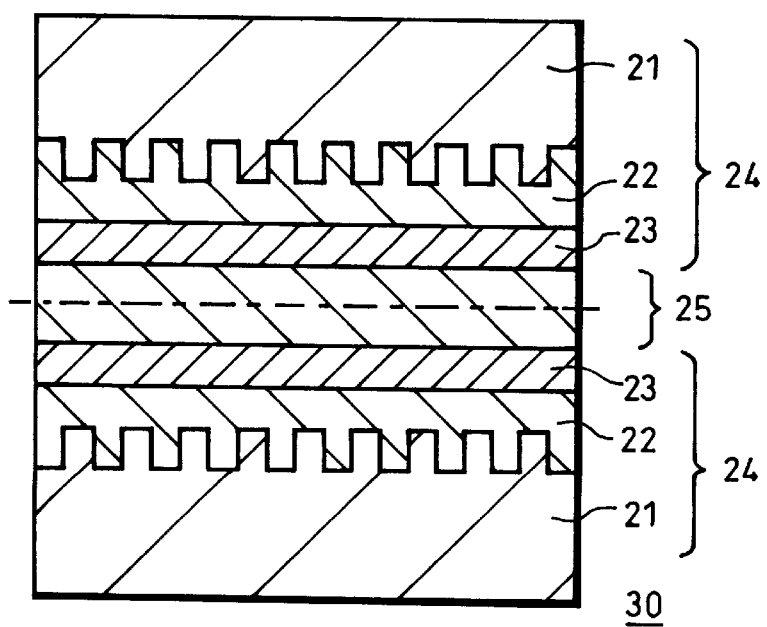
FIG. 2 is a schematic sectional view of an optical information recording medium.

An epoxy resin composition of the present invention comprises at least a bisphenol type epoxy resin (A), an epoxy resin (B) shown in the following formula and a cationic polymerization catalyst (C).

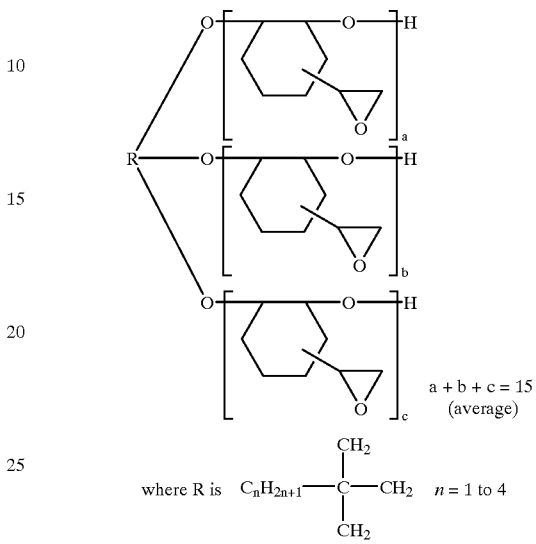

where R is $C_nH_{2n+1}\!-\!\underset{\underset{CH_2}{|}}{\overset{\overset{CH_2}{|}}{C}}\!-\!CH_2$   $n = 1$ to $4$ $a + b + c = 15$ (average)

In the present invention, the bisphenol type epoxy resin (A) refers, for example, to bisphenol A type epoxy resin, bisphenol F type epoxy resin etc. obtained by reacting bisphenol A, bisphenol F etc. with epichlorohydrin, or to epoxy resin prepared by hydrogenation thereof.

The above-mentioned epoxy resin may have been modified with nitrile rubber, urethane etc. when no problem.

Meanwhile, if the epoxy resin composition of the present invention is formed as an adhesive layer on a disk substrate, since a technique such as a spin coating, a screen printing or the like is used, the bisphenol type epoxy resin (A), which is incorporated in a large amount, is preferably used in the form of a liquid so as to improve its coating property.

The bisphenol type epoxy resin (A) is also commercially available. Examples include KRM-2408 (produced by Asahi Denka Kogyo (K.K.)), ST3000 (produced by Toto Kasei (K.K.)) etc.

The epoxy resin of the above formula used in the present invention is used to improve both the thermal resistance and adhesive properties of the cured resin after irradiation of energy rays.

The above-mentioned epoxy resin may be synthesized or can be obtained as commercial products such as EHPE-3150 (produced by Daicel Chemical Industries, (Ltd.)) etc. This commercial product, EHPE-3150, is the epoxy resin of the above formula where n is 2.

The ratio by weight between the bisphenol type epoxy resin (A) and the epoxy resin (B) in the epoxy resin composition is preferably in the range of 100/5 to 100/50. With this range given, the thermal resistance and adhesive properties of the cured resin after irradiation of energy rays are well balanced.

In the above weight ratio, a small amount of the epoxy resin (B) results in a decrease in the improving effect on thermal resistance. On the other hand, a large amount of the epoxy resin (B) leads in many cases to an increase in the hardness and an decrease in the adhesive properties of the cured resin.

Upon irradiation with energy rays, the cationic polymerizable catalyst (C) used in the present invention generates so-called Lewis acid and is not particularly limited, and any of such known catalysts can be used. Examples are aromatic diazonium salts, aromatic sulfonium salts, aromatic iodonium salts, aromatic selenium salts etc.

The cationic polymerizable catalyst (C) can also be obtained as a commercial product. Examples of such aromatic sulfonium salts include SP-150 and SP170 (produced by Asahi Denka Kogyo (K.K.)), UVE1014 (produced by General Electric Co., Ltd.) and FC-509 (manufactured by Minnesota Mining and Manufacturing Co.), and examples of such aromatic diazonium salts include PP-30 (produced by Asahi Denka Kogyo (K.K.)) etc.

The amount of cationic polymerizable catalyst (C) added is preferably in the range of 1 to 6 parts by weight relative to 100 parts in total of the bisphenol type epoxy resin (A) and the epoxy resin (B).

Other components such as ion exchanger (D), fillers (E) and coupling agent (F) can be added to the epoxy resin composition of the present invention.

The ion exchanger (D) is used to capture ionic substances extracted with water from the cationic polymerization catalyst and bisphenol type epoxy resin. The ion exchanger (D) is not particularly limited, and any known one can be used or obtained as a commercial product. Examples include IXE-600, 633, 1100, 1320 (produced by Toagosei Chemical Industry Co., (Ltd.)), Kyoward 500, 600 (produced by Kyowa Kagaku (K.K.)), Tomix AD500, 600 (produced by Tomita Seiyaku (K.K.)), and Ahbanlite CG120 (produced by Organo (Co., Ltd.)). The structure of IXE-600 is:

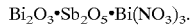

$Bi_2O_3 \cdot Sb_2O_5 \cdot Bi(NO_3)_3$.

The amount of ion exchanger (D) added to the epoxy resin composition depends on the type of cationic polymerization catalyst (C) but in general is preferably in the range of 2 to 8 parts by weight relative to 1 part by weight of cationic polymerization catalyst (C).

With an amount of less than 2 parts by weight given, pin holes readily occur in the recording layer, while, with an amount of larger than 8 parts by weight, the hardness of the epoxy resin composition is often low.

Fillers (E) are added as an extender to the adhesive layer or to confer constitutional viscosity on it. For example, Aerogel #130, #200, #380, and R974 (all of which are fine powder silica) etc. can be used.

Also, the coupling agent (F) is added to improve the dispersibility of the ion exchanger (D) and the fillers (E).

The respective components for the epoxy resin composition are mixed uniformly by a dispersing machine such as a three-roll mill etc., and the target epoxy resin composition can be obtained.

Then, the epoxy resin composition of the present invention can be applied as an adhesive layer onto the bonding faces of disk substrates to produce an optical information recording medium of good qualities being free of distortion or warpage or bending even under the circumstances of high temperature and high humidity.

The structure of an optical information recording medium e.g. an optical disk to which the epoxy resin composition of the present invention has been applied as an adhesive layer is shown in FIG. 1. As shown in FIG. 1, the optical disk 10 is formed of a so-called lamination type optical disk in which two disk substrates 4 having two transparent plastic substrates 1, each being provided on one side with a disk of 0.6 mm in thickness having a recording layer (reflective layer) 2 consisting of e.g. an Al layer etc. with a concave and a convex (pits) indicating information and a protective layer 3 of 5 to 10 μm in thickness in this order, are prepared, and the two disk substrates 4 are faced each other such that their recording layers (reflective layers) 2 are arranged inside and integrated via an adhesive layer 5.

This optical disk 10 is applied preferably to e.g. the above-mentioned DVD etc.

To apply the epoxy resin composition of the present invention to the bonding faces of disk substrates 4 in the optical disk 10, it is general that an adhesive layer 5 is applied and formed using techniques such as a spin coating method, a screen printing method etc. in which the epoxy resin composition is fed to the bonding faces by means of a dispenser etc. followed by rotation of the disk base 4 to give a uniform thickness, but any other methods can also be used for formation of the adhesive layer 5.

The thickness of the adhesive layer 5 formed on the bonding faces is generally in the range of 10 to 60 μm.

The adhesive layer 5 may be formed on both of disk substrates 4 to be bonded or alternatively it may be formed on only one of disk substrates 4.

After formation of the adhesive layer using the epoxy resin composition of the present invention on the bonding faces, it is irradiated with energy rays such as an ultraviolet ray or the like to initiate cationic polymerization.

If an ultraviolet ray is used as the energy rays, its irradiation amount is preferably set to be 50 to 1000 mJ/cm².

After irradiation with the energy rays, the disk substrates 4 are bonded mutually with pressure such that the recording layers 2 are inside, and the desired optical information recording medium 10 can be obtained when the subsequent curing reaction has been completed.

Hereinafter, the epoxy resin composition of the present invention and the optical information recording medium using the same are described in detail for their properties and characteristics with reference to the practical embodiments.

(Embodiment 1)
(i) Epoxy Resin Composition

The following components were thermally molten and mixed with a three-roll mill to obtain a desired epoxy resin composition.
(A) Hydrogenated bisphenol A type epoxy resin (KRM2408, produced by Asahi Denka Kogyo (K.K.)) 100 parts by weight
(B) Epoxy resin having the structure of the above formula (EHPE-3150, produced by Daicel Chemical (Industries, Ltd.)) 5 parts by weight
(C) Cationic polymerization catalyst (SP-150, produced by Asahi Denka Kogyo (K.K.)) 5 parts by weight
(D) Ion exchanger (IXE-1320, produced by Toagosei Chemical Industry (Co., Ltd.)) 20 parts by weight
(E) Fine power silica 3 parts by weight
(ii) Manufacturing of Optical Recording medium The epoxy resin composition produced under the above item was used to form the adhesive layer 5 by a screen printing method on each of the bonding faces of 2 disk substrates.

Then, 100 mJ/cm² ultraviolet ray was irradiated, and the bonding faces were laminated to obtain the desired optical disk (optical information recording medium) 10 shown in FIG. 1.

(Embodiments 2 to 6)
(B) The epoxy resin having the structure of the above formula (EHPE-3150, produced by Daicel Chemical Industries, (Ltd.)) was incorporated at ratios of 10, 20, 30, 40 and 50 parts by weight respectively to form epoxy resin compositions in the same manner as in Embodiment 1. The resulting compositions were used to produce optical disks (optical information recording media) 10 of Embodiments 2 to 6, respectively.

(Comparative Example 1)

(A) Hydrogenated bisphenol A type epoxy resin (KRM2408, produced by Asahi Denka Kogyo (K.K.)) 100 parts by weight (C) Cationic polymerization catalyst (SP-150, produced by Asahi Denka Kogyo (K.K.)) 5 parts by weight (D) Ion exchanger (IXE-1320, produced by Toagosei Chemical Industry (Co., Ltd.)) 20 parts by weight (E) Fine powder silica 3 parts by weight The above resin composition was formed into an epoxy resin composition in the same manner as in Embodiment 1, and it was used for preparing an optical disk 10.

(Comparative Example 2)

(A) Hydrogenated bisphenol A type epoxy resin (KRM2408, produced by Asahi Denka Kogyo (K.K.)) 100 parts by weight (B') Solid bisphenol A type epoxy resin+Hydrogenated bisphenol A type epoxy resin (ST5100, produced by Toto Kasei (K.K.)) 20 parts by weight (C) Cationic polymerization catalyst (SP-150, produced by Asahi Denka Kogyo (K.K.)) 5 parts by weight (D) Ion exchanger (IXE-1320, produced by Toagosei Chemical Industry (Co., Ltd.)) 20 parts by weight (E) Fine powder silica 3 parts by weight The above resin composition was formed into an epoxy resin composition in the similar manner to that in Embodiment 1, and it was used for preparing an optical disk 10.

In the above ingredients, (B') ST5100 is a mixture (produced by Toto Kasei (K.K.)) of solid bisphenol A type epoxy resin and solid hydrogenated bisphenol A type epoxy resin.

(Comparative Example 3)

(A') Solid alicyclic epoxy resin (ERL4299) 100 parts by weight (B) Epoxy resin having the structure of the above formula (EHPE-3150, produced by Daicel Chemical Industries, (Ltd.)) 20 parts by weight (C) Cationic polymerization catalyst (SP-150, produced by Asahi Denka Kogyo (K.K.)) 5 parts by weight (D) Ion exchanger (IXE-1320, produced by Toagosei Chemical Industry (Co., Ltd.)) 20 parts by weight (E) Fine powder silica 3 parts by weight The above resin composition was formed into an epoxy resin composition in the similar manner to that in Embodiment 1, and it was used for preparing an optical disk 10.

(iii) Evaluation Methods

The optical disks 10 prepared above in Embodiments 1 to 6 and Comparative Examples 1 to 3 were evaluated with respect to the following evaluation items (a) to (e). The evaluation results are shown in Table 1.

TABLE 1

| | Embodiment 1 | Embodiment 2 | Embodiment 3 | Embodiment 4 | Embodiment 5 | Embodiment 6 | comparative example 1 | comparative example 2 | comparative example 3 |
|---|---|---|---|---|---|---|---|---|---|
| Ingredients of Adhesive Layer | | | | | | | | | |
| KRM2408 (A) | 100 | 100 | 100 | 100 | 100 | 100 | 100 | 100 | — |
| EHPE3150 (B) | 5 | 10 | 20 | 30 | 40 | 50 | — | — | 20 |
| ST5100 | — | — | — | — | — | — | — | 20 | — |
| ERL4299 | — | — | — | — | — | — | — | — | 100 |
| SP150 (C) | 5 | 5 | 5 | 5 | 5 | 5 | 5 | 5 | 5 |
| IXE1320 (D) | 20 | 20 | 20 | 20 | 20 | 20 | 20 | 20 | 20 |
| Fine Powder Silica (E) | 3 | 3 | 3 | 3 | 3 | 3 | 3 | 3 | 3 |
| Value | | | | | | | | | |
| Corrosion Properties of Disk | ◯ | ◯ | ◯ | ◯ | ◯ | ◯ | ◯ | ◯ | ◯ |
| Solvent Resistance | ◯ | ◯ | ◯ | ◯ | Δ | Δ | Δ | Δ | ◯ |
| Pressure Cooker Test | ◯ | ◯ | ◯ | ◯ | Δ | Δ | Δ | Δ | Δ |
| Water Absorption Degree | ◯ | ◯ | ◯ | ◯ | ◯ | ◯ | ◯ | ◯ | X |
| Tilt Angle | Δ | ◯ | ◯ | ◯ | ◯ | ◯ | X | X | Δ |
| Glass Transition Temp. °C. | 80 | 90 | 104 | 123 | 135 | 147 | 75 | 75 | 93 |

For the evaluation item (e), the epoxy resin composition was applied to 2 plates of glass to give an adhesive area of 25 mm width×12.5 mm lap, and it was irradiated with 3 J/cm$^2$ ultraviolet ray. The resulting glass base was used as a sample to be evaluated.

(a) corrosion Properties of Disk

The prepared disk 10 was stored for 100 hours in a thermostatic chamber at 80° C. and 85% humidity and then examined for external appearance. In Table 1, the symbol ◯ is assigned to a sample with a good external appearance without pin holes in the recording layer; Δ, a sample with a few pin holes in the recording layer; and X, a sample with innumerable pin holes in the recording layer.

(b) Tilt Angle

The prepared disk 10 was stored for 100 hours in a thermostatic chamber at 80° C. and 85% humidity, then taken out, and examined 5 minutes later for tilt angle. In Table 1, ⊚ is assigned to a sample having a tilt angle of less than 3 mrad; ○, a sample having a tilt angle of from 3 mrad to 5 mrad; and X, a sample having a tilt angle of 5 mrad or more.

This evaluation of tilt angle is most important, and the degrees of distortion and warpage of the optical disk substrate can be directly known. These distortion and warpage are assumed to result from the thermal resistance, adhesive properties and moisture absorption of the adhesive layer.

(c) Solvent Resistance

The sample (adhesive cured product) was cut into pieces of 0.3×50×50 mm in size and immersed in an organic solvent or acetone for 7 days and examined for change in weight. In Table 1, the symbol ⊚ is assigned to a sample with a change in weight of less than 15 %; ○, a sample with a change in weight of less than 17%; Δ, a sample with a change in weight of less than 20%; and X, a sample with a change in weight of 20% or more.

By this evaluation of solvent resistance, the adhesive properties of the adhesive layer can be inferred. Because an adhesive layer excellent in adhesiveness has already been sufficiently cured, it may swell in acetone but does not dissolve in it. However, if the adhesive properties of the adhesive layer are insufficient, acetone permeates through that part into the layer to cause swelling and increase the weight of the layer, so that the adhesive properties can be indirectly known.

(d) Water Absorption Rate

The adhesive cured product was cut into pieces of 0.3×50×50 mm in size and immersed in distilled water at 23° C. for 24 hours and examined for change in weight. In Table 1, the symbol ○ is assigned to a sample with a change in weight of less than 5%; and X, a sample with a change in weight of 5% or more.

By this evaluation of water absorption rate, the moisture absorption of the adhesive layer can be inferred. That is, the adhesive properties of the adhesive layer under high humidity is indirectly evaluated assuming that the adhesive layer easily absorbing water will drop its adhesive properties under high humidity.

The water absorption rate and (b) the tilt angle, or the water absorption rate and (e) pressure cooker test described below, are related to each other.

(e) Pressure Cooker Test

Glass substrates bonded via the above-described adhesive layer were kept under the conditions of 121° C., 2 atmospheric pressure and 100% relative humidity (RH) for 50 hours in a PC (pressure cooker) machine. Thereafter, the sample was taken out from the PC machine and examined for tensile strength by means of Tension (i.e. tensile strength tester).

In Table 1, the symbol ○ is assigned to a sample with the glass broken without a trace of penetrated water; Δ, a sample with the glass broken with a small trace of penetrated water; X, a sample from which the adhesive layer was peeled off without breaking the glass.

By this evaluation, the adhesive properties of the as well as the lowering of the adhesive properties of the adhesive layer due to moisture absorption can be known.

In Table 1, Embodiments 1 to 6 show good results with respect to corrosion properties of disk, tilt angle, thermal resistance, solvent resistance, water absorptivity and pressure cooker test. The detailed examination of the results indicate that as the amount of the epoxy resin shown in the above formula is increased, glass transition temperature is raised and thermal resistance is improved, while solvent resistance and adhesive properties in the pressure cooker test tend to be lowered.

Accordingly, it is estimated that the ratio by weight between the bisphenol type epoxy resin (A) and the epoxy resin (B) of the above formula should be 100/5 to 100/50, preferably 100/10 to 100/40, more preferably 100/15 to 100/25.

In Comparative Example 1, the epoxy resin of the above formula is not incorporated. In this case, the results of the tilt angle, solvent resistance and pressure cooker test are not good.

In Comparative Example 2, the solid bisphenol type epoxy resin has been incorporated in place of the epoxy resin of the above formula. In this case, the results of the tilt angle, solvent resistance and pressure cooker test are not good similarly to comparative Example 1.

In Comparative Example 3, the alicyclic epoxy resin (A') has been incorporated in place of the bisphenol type epoxy resin. In this case, moisture absorptivity is high, and simultaneously the results of the pressure cooker test and tilt angle are not good.

As can be seen from the above results, the epoxy resin composition of the present invention can be applied as an adhesive layer to an optical disk to construct an optical information recording medium of good qualities which is excellent in thermal resistance, solvent resistance and moisture resistance and does not cause the distortion and warpage under the circumstances of high temperature and high humidity.

The Embodiments as illustrated above are related to optical information recording media where the recording layer 2 and the protective layer 3 have been sequentially formed in this order on the plastic substrate 1 to form the disk substrate 4. However, even if the disk substrate 4 is designed such that it is formed with other layers in addition to the recording layer 2 and the protective layer 3, optical information recording media can be obtained similarly by applying the epoxy resin composition of the present invention as the adhesive layer 5.

The epoxy resin composition of the present invention and the optical information recording media using the same are not limited to the examples illustrated above and there can be effected various modifications within the spirit of the present invention.

The epoxy resin composition of the present invention as described above initiates reaction upon irradiation with energy rays and gives a product excellent in thermal resistance and adhesive properties, and the adhesive properties thereof are not lowered even under the circumstances of high humidity.

In addition, the corrosion of the recording layer due to ionic substances in the adhesive layer is prevented by applying the epoxy resin composition of the present invention as an adhesive layer to optical information recording media such as an optical disk. Further, the optical information recording media do not distort and warpage, and thus optical recording media excellent in reproduction characteristic of recording signals can be obtained.

Accordingly, it can be applied to a large-capacity optical disk such as a DVD etc. to constitute excellent optical information recording media.

What is claimed is:

1. An epoxy resin composition, which initiates cationic polymerization upon irradiation, which consists of:

(A) at least one bisphenol epoxy resin;
(B) at least one epoxy resin of the formula;

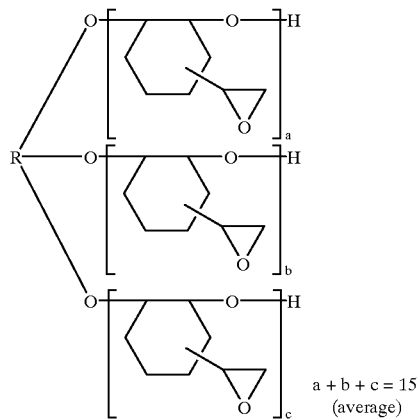

a + b + c = 15 (average)

where R is

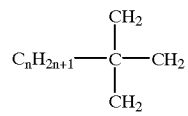

and (C) a cationic polymerization catalyst;

(D) optionally, ion exchanger; and (E) optionally, a filler.

2. An epoxy resin composition according to claim 1, wherein a ratio by weight of the bisphenol epoxy resin (A) in said epoxy resin composition and the epoxy resin (B) shown in the above formula ranges from 100/5 to 100/50.

3. In an optical information recording medium having a recording layer and an adhesive layer between at least two substrates, said optical information recording medium being characterized in that said adhesive layer comprises an adhesive made of the epoxy resin composition claimed in claim 1.

4. An epoxy resin composition according to claim 1, wherein the ion exchanger is $Bi_2O_3 \cdot Sb_2O_5 \cdot Bi(NO_3)_3$.

5. The epoxy resin composition according to claim 1, wherein an ion exchanger is present.

* * * * *